Jan. 27, 1942.     E. RHEIN     2,271,207

REMOTE CONTROL ARRANGEMENT

Filed Aug. 23, 1939

INVENTOR.
EDUARD RHEIN
BY H.S. Snover
ATTORNEY.

Patented Jan. 27, 1942

2,271,207

UNITED STATES PATENT OFFICE 2,271,207

REMOTE CONTROL ARRANGEMENT

Eduard Rhein, Berlin, Germany, assignor to Telefunken Gesellschaft für Drahtlose Telegraphie m. b. H., Berlin, Germany, a corporation of Germany Application August 23, 1939, Serial No. 291,502
In Germany August 29, 1938

3 Claims. (Cl. 172—239)

The present invention relates generally to remote control systems employing an electric driving means and more particularly to an arrangement wherein a single motor is employed for selectively adjusting any one of several variable elements.

While systems of this general type have been devised heretofore, it is to be noted that such systems as are already known, involve elaborate and complicated controls making the systems bulky, expensive and unreliable.

In accordance with the present invention control systems of the type mentioned above are greatly simplified by the utilization of a motor which is provided with two stators disposed in different parallel planes extending at right angle to the motor shaft whereby the one or the other stator can be excited selectively so that the axially shiftable rotor can be drawn either into the one stator plane, or into the other stator plane whereby the shaft of the motor may be coupled thereby with one or the other adjustment device.

Figure 1:
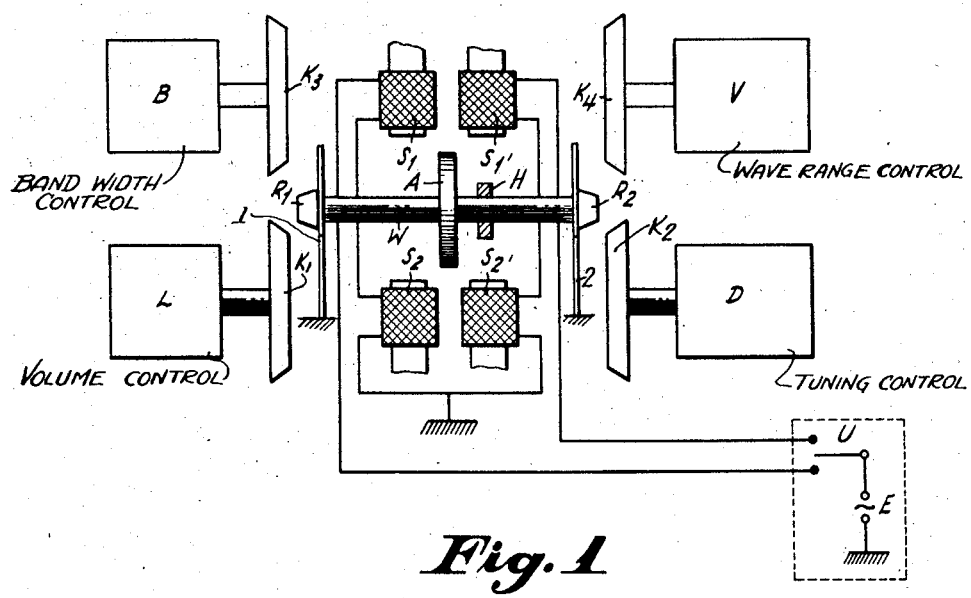
Figure 2:
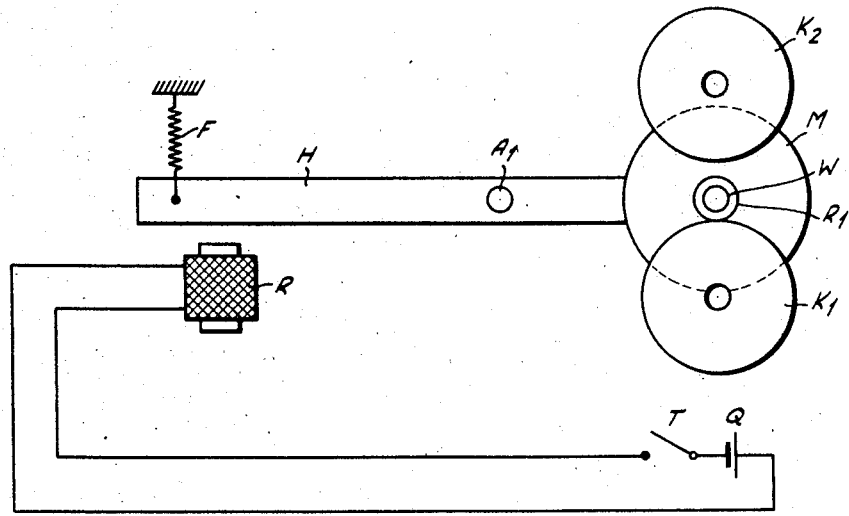

An example of construction according to the invention is shown in the drawing wherein Fig. 1 illustrates a plan view of a motor according to the invention arranged to control separately four adjustable devices; and, Fig. 2 is a diagrammatic representation of a motor displacing instrumentality constructed in accordance with the present invention. Referring more particularly to Figure 1, the shaft W of the motor constructed, for instance, in accordance with the Ferraris principle is mounted in an axially shiftable manner and carries a short circuit disk A. In a plane parallel to the plane of the disk two stator poles $S_1$ and $S_2$ are arranged which carry the main coils. The appertaining auxiliary poles situated in the same plane and displaced in the circumference by 90° relative one another are not shown in the figures. In a plane extending likewise in parallel to the disk A two further stator poles $S_1'$ and $S_2'$ also carrying main coils are arranged at the other side of the short circuit disk A. By means of the switch U situated at the place of control the main coil system $S_1$, $S_2$ or the corresponding system $S_1'$, $S_2'$ can be connected selectively to the alternating voltage source E and thereby energized. The short circuit disk A is drawn, in either case, into the plane of the excited stator. In the one case the rotor shaft is coupled by means of the wheel $R_1$ with the friction wheel $K_1$ and thereby with the volume control L of the receiver, and in the other case the shaft is coupled across the correspondingly constructed wheel $R_2$ and the friction wheel $K_2$ with the variable condenser D of the receiver.

If it is necessary that the motor also controls further adjustment devices such as, for instance, the wave range switch V or the band width control means B of the receiver, this can be accomplished by the same motor in that the motor is shifted or swung around at right angle to the shaft W and thereby coupled also with the friction wheels $K_3$ or $K_4$ of these adjustment means. This swinging around, or displacement of the motor can be controlled by a simple relay R such as is clearly seen from Fig. 2. The motor M is hereby rotatably mounted about a shaft $A_1$ by means of a lever arm H fastened thereto. The torque moment produced by the weight of the motor is balanced in the position shown in Figure 2 by means of a spring F thus maintaining the motor in such a position that the wheel $R_1$ will engage the friction wheel $K_1$ if windings $S_1$, $S_2$ are energized and wheel $R_2$ will engage friction wheel $K_2$ if windings $S_1'$, $S_2'$ are energized. Through excitation of the relay magnet R the lever arm H is swung about against the force of gravity at the motor and against the spring F such that upon energization of windings $S_1$, $S_2$ the front wheel $R_1$ engages the friction wheel $K_3$ whereas energization of $S_1$, $S_2'$ will cause wheel $R_2$ to engage wheel $K_4$. The motor may thereby be coupled with the band width control means B provided that the stator $S_1$, $S_2$ windings are energized at the same time that R is energized or with the wave range control V provided windings $S_1'$ and $S_2'$ are energized at the same time relay R is energized.

The exciter coil of the relay magnet R is switched-in by the switch T which is connected in series to the direct voltage source Q located preferably at the place from which the control is carried out.

A retractive force provided by springs 1 and 2 acts upon the shaft W in the axis thereof such that the shaft is normally maintained in the position shown in Fig. 1, or also in one of the two stator planes. The upper portion of each spring plate is slotted and shaft W is passed through these slots. The slots are made of sufficient length so as to permit the shaft to be shifted upwardly by operation of lever H from the position shown so as to bring the shaft W in a position to be driven by either wheel $K_3$ or wheel $K_4$ depending upon which set of magnets is energized.

I claim:

1. In an electric motor, a pair of stator members, a rotor member, said rotor member being axially shiftable in either direction, means biasing the rotor to a central position relative to the stator members, one of said stator members being mounted in a plane extending at right angle to the axis of the rotor member which plane is displaced to one side of said central position of the rotor, the other stator member being mounted in a plane parallel to the plane of the first mentioned stator member and displaced a substantially equal amount on the other side of the central position of the rotor, and switching means for selectively energizing either of said stators so that the axially shiftable rotor member is drawn into operative influence of the field of the particular stator energized.

2. The arrangement described in claim 1 wherein, means are provided for shifting the motor as a whole in a plane parallel with the planes of said stators.

3. The arrangement described in claim 1 wherein said rotor member comprises a disk of conducting material mounted on a shaft, the shaft and disk being axially displaceable as a whole.

EDUARD RHEIN.